Figure 1:
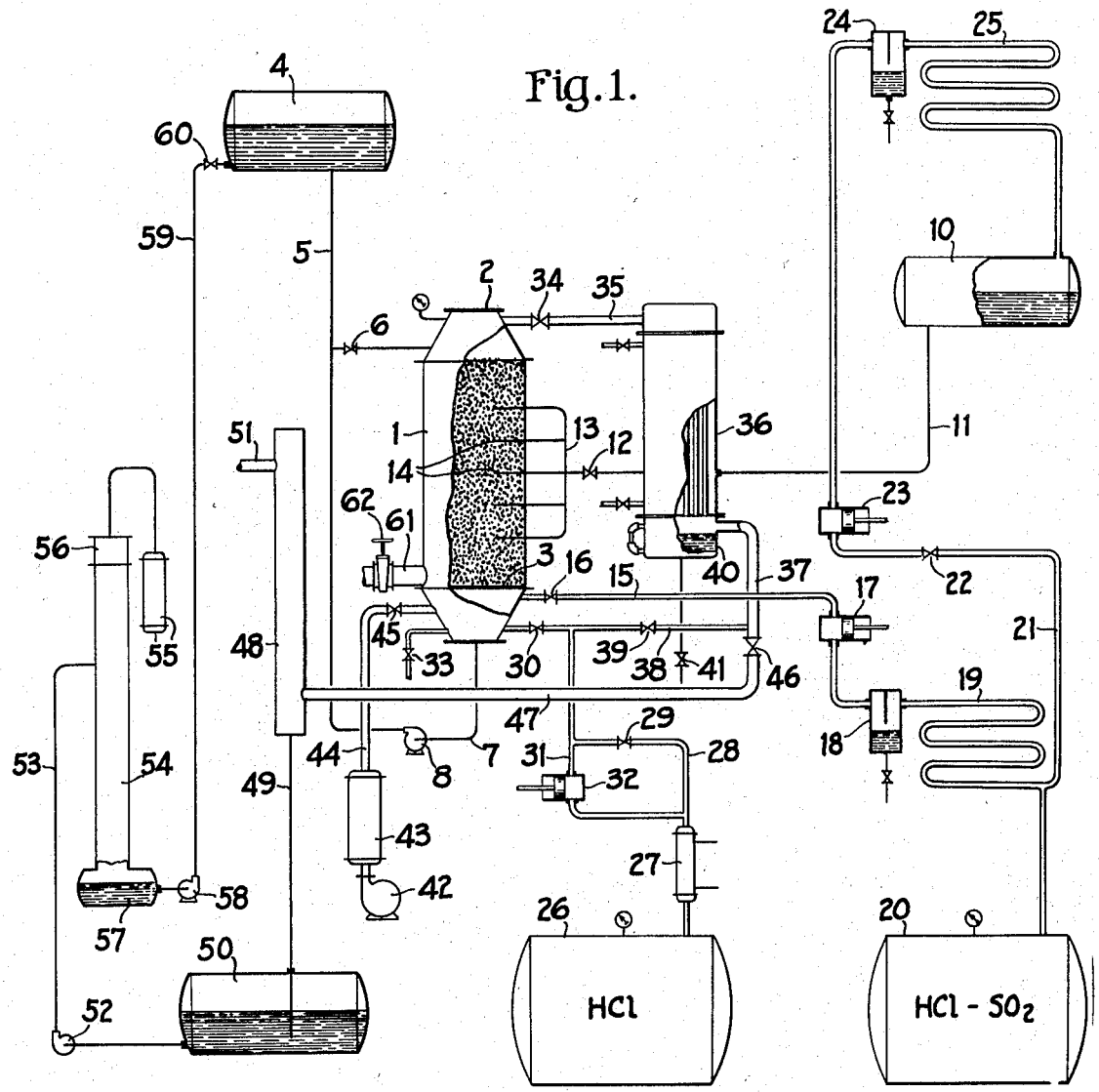

April 22, 1941.  R. L. HASCHE  2,239,095

SACCHARIFICATION OF WOOD

Filed June 21, 1939  2 Sheets-Sheet 1

Inventor
Rudolph Leonard Hasche
N. M. Perrins
By Daniel J. Mayne
Attorneys

April 22, 1941.   R. L. HASCHE   2,239,095
SACCHARIFICATION OF WOOD
Filed June 21, 1939   2 Sheets-Sheet 2

Inventor
Rudolph Leonard Hasche
By N. M. Perrins
Daniel T. Mayne
Attorneys

Patented Apr. 22, 1941

2,239,095

UNITED STATES PATENT OFFICE 2,239,095

SACCHARIFICATION OF WOOD

Rudolph Leonard Hasche, Kingsport, Tenn., assignor to Eastman Kodak Company, Rochester, N. Y., a corporation of New Jersey Application June 21, 1939, Serial No. 280,371

5 Claims. (Cl. 127—37)

This invention relates to an improved process for the conversion of cellulosic material, particularly wood, to sugars and the separation of the same from the lignin in a form suitable for fermentation. Chemical processes which accomplish the conversion of cellulose to sugar come under the name of saccharification, and I shall use this terminology in describing my invention.

Saccharification of wood is assuming greater and greater commercial importance as a means of producing cheap edible sugar as well as sugar solutions for fermentation with yeast to ethyl alcohol or bacterial fermentation to butyl alcohol or organic acids. At the present time there are two general types of processes in use for conversion of wood cellulose to sugars and dissolving the latter from encrusting materials such as the lignin, resins, and tannins. Both of these methods employ mineral acids for resolving the wood fiber into the desired constituents.

In one process dilute sulfuric acid is used and the treatment is carried out under relatively high pressures and temperatures. This process, while it has the advantage of inducing less corrosive conditions, gives very poor yields of sugars due to the formation of by-products and carbonization.

The second method, which is more favored, is based on the discovery of Willstaetter and Zechmeister in 1913, that cold 40% HCl is a more efficient saccharifying agent than the 35-36% concentration. This process is claimed to give very high yields, almost quantitative, in the conversion of cellulose to sugar; however, it has many disadvantages.

There are obvious difficulties in the recovery of concentrated HCl, and it is reported that even under the best operation the loss of acid is considerable. In carrying out the process under the most optimum conditions the countercurrent extraction principle must be employed in which diffusers are arranged in series of 8 to 10. After the wood fiber has been saccharified, HCl must be removed from the lignin which is accomplished by similar countercurrent extraction in batteries of 8 to 10 and a very dilute hydrochloric acid is obtained which has to be concentrated. Since hydrogen chloride forms a constant boiling point mixture containing about 20.5% HCl, in order to bring it up to 40% solution, it must be bolstered with dry HCl gas. Obviously, the battery of diffusers and washers, when operating continuously, require a very complicated system of piping, valves and manifolds, because when a diffuser or washer is thrown out of the system for charging or discharging, there must be a change in the flow of the extracting liquids.

Another very serious defect in the latter process is the high initial cost of the plant due to the long saccharification and washing cycles. The volume of the diffusers is very great and they must be made of expensive materials in order to resist the severe corrosive conditions which they are called upon to meet. A fresh charge of wood chips, when passing through a complete cycle, requires as much as three days time.

In order to overcome the difficulties inherent in that process numerous modifications have been proposed. The most common modification is the use of dry HCl gas in some phase of the operation. In that process the sugar solutions obtained after the extracting acid has passed through the last diffuser, run about 30-35% sugar and 35-40% hydrochloric acid. While considerable of the hydrochloric acid can be removed from the syrup by evaporation at ordinary temperatures, further quantities of acid can only be removed by resorting to spray drying. The cellulosic material, when it has arrived at the last diffuser—now only pure lignin—contains large amounts of hydrochloric acid. As we have stated above, this acid is washed out in a battery of diffusers and gives a very dilute solution. It will thus be apparent that the second method of saccharification of wood possesses the disadvantage of high initial cost and large maintenance and operating expense.

As I have stated, the use of dry HCl gas has been proposed to shorten the time of saccharification and simplify the recovery of HCl in a concentrated state. One proposal has been to soak wood chips by preliminary treatment with 35-36% HCl and then pass dry HCl gas through the material to increase its concentration to as much as 54%. The later steps of the process, involving the leaching of sugar, follow very closely the second method referred to above.

Other proposals are to dry wood chips to a moisture content of 20-30% and then pass dry HCl gas through the material to obtain a high acid concentration within the fibers.

These processes, while they appear to be improvements, are not practicable because there is a very high heat of absorption or solution of HCl in water or dilute acid and consequently the mass of cellulosic material heats up to 60° to 100° C. under which conditions severe carbonization occurs. These workers have shown no practical method for removing this heat of solution. In one process where the wood is wet with 35% HCl it is then passed through a multi-hearth digester similar to a Wedge pyrites roaster. The hearths are cooled by indirect means and rabble arms move the mass downwards from hearth to hearth countercurrent to dry HCl gas until an approximately 54% HCl solution is present in the cellulosic material. From thence, it passes into a drier where hot air removes the HCl and water and thence to diffusers for leaching the lignin to obtain a strong sugar solution. This process, while it had apparent advantages over other processes was abandoned because of the mechanical and heat transfer difficulties and because the mass containing fuming acid was very difficult to handle.

Later, attempts were made to remove the heat of solution by employing liquefied hydrogen chloride and carrying the reaction out under the saturation pressure of HCl at the prevailing temperature. This process which at first sight appears attractive, is impractical because of the great expense of liquefying HCl and the very high vapor pressure of the liquid at any temperature around atmospheric.

My invention has as an object the use of the dry method by employing a direct or internal refrigerant which is practical to use at operating temperatures from atmospheric down to approximately −30° C. More particularly, I employ mixtures of liquid sulfur dioxide and HCl and simultaneously cool and increase the strength of the HCl in the cellulosic material up to any desired point. Mixtures of $SO_2$ and HCl liquefy at moderate temperatures and pressures and the saccharification temperature when using these mixtures can be readily controlled so as to carry out the operation under most optimum conditions.

It will be obvious that it is very practical to supply the refrigeration required for absorbing the heat of solution of HCl by utilizing the latent heat of vaporization of sulfur dioxide and of sulfur dioxide-HCl mixtures. In this way there is no danger of local overheating which is so injurious in the saccharification of wood. Conversion of cellulose to sugar is a reaction which is very sensitive to temperature. For a given hydrochloric acid concentration—for instance, if the 40% HCl is used—the temperature at no time can exceed 30° C. For higher acid concentrations, which give more rapid saccharification, the temperature must be considerably lower.

Another feature of my invention is an improved method of obtaining uniform and rapid distribution of a high hydrochloric acid concentration throughout the cellulosic mass. It will be obvious that the speed and the uniformity of the treatment of each individual chip depends upon the rate of diffusion from the surface to the interior. As I shall show later in my description I obtain equilibrium conditions through the mass very rapidly by a breathing action produced by pumping dry gas into the mass then rapidly releasing the pressure and continuing this process several times.

One method of operating my invention is to treat wood chips with approximately 35% hydrochloric acid for about one hour. The acid is then drained and the cellulosic material allowed to season 10 to 15 hours. This seasoning time is necessary in order to allow uniform diffusion and distribution of the acid throughout the cellulosic mass. During this pretreatment, the wood can be maintained at atmospheric temperature without injurious effect. As a matter of fact, a certain amount of saccharification occurs during this soaking or seasoning period. After the pretreatment, liquid sulfur dioxide is introduced into the mass of the chips. The sulfur dioxide in vaporizing cools down the mass to approximately its boiling point or −10° C. Thereafter, a liquefied mixture of approximately 50% $SO_2$ and 50% HCl is introduced into the vessel. The mixture vaporizes furnishing additional cooling for absorbing the heat of solution of HCl in the 35% acid. At the end of this period the $SO_2$ has substantially all vaporized and is removed from the vessel as a gas, while substantially all of the HCl is absorbed giving a high acid concentration in the cellulosic material.

However, a short treatment does not usually suffice to obtain uniform permeation and diffusion throughout the mass. Therefore HCl gas is pumped into the vessel until the pressure is built up to an appreciable pressure above atmospheric, say 2 atmospheres. The pressure is then rapidly reduced and by repeating this process several times the breathing action allows a very rapid and uniform diffusion throughout the mass. This part of the process is very important and overcomes one of the obstacles which has not been satisfactorily met heretofore. As I shall show further in the description, this treatment can readily be accomplished by using a pressure accumulator to store the gaseous HCl. By connecting the vessel with the accumulator the pressure can be rapidly built up and the reverse process of releasing the pressure accomplished by pumping the gas from the vessel and returning it to the gas accummulator. After the treatment the mass is allowed to stand for a sufficient length of time for saccharification to be completed. This is usually completed in 10–15 hours or longer.

After saccharification has been completed, vacuum is applied to the vessel and as much HCl gas as possible is removed. It is compressed by a vacuum pump and reliquefied in a storage vessel containing liquid sulfur dioxide. This can be done at a moderate temperature and pressure since mixtures of sulfur dioxide and HCl liquefy at temperatures intermediate between liquefying points of the individual constituents. Further quantities of HCl gas are swept from the mass by steaming, preferably under reduced pressure. The passage of steam is continued until the constant boiling point concentration of HCl acid remains in the chips. This concentration is approximately 21% HCl. The partial pressure relationships of hydrochloric acid solutions are such that substantially dry HCl gas can be removed from solutions by steaming down to a concentration of the constant boiling point mixture. It is sufficiently dilute so that it may be flushed from the wood with hot air without causing carbonization. The HCl is recovered therefrom by scrubbing. The dilute acid obtained from the scrubbers can be readily concentrated to the constant boiling composition and used in the initial pre-treatment.

The treated mass now contains substantially pure lignin and sugar and only small traces of HCl. It is leached with water preferably in a countercurrent system so as to produce a sugar solution of 10–15% concentration leaving the lignin behind in a substantially pure condition.

This sugar solution then is heated up to from 60–100° C. for a short time, the residual HCl being sufficient to produce inversion of the polyoses to the monomeric sugars. The pH of the solution is then adjusted with a small amount of lime so that the solution can be subjected to fermentation or if it is desired, the sugar may be obtained in the solid form by evaporation and crystallization.

By applying the new method which I have disclosed, depending on the type of wood treated, I have been able to obtain sugar yields of 50–60% based on the dry weight of wood and lignin from 25–35%. Certain quantities of acetic acid are also obtained which build up in the dilute HCl and can be recovered therefrom.

It will be apparent that certain modifications of my process can be applied without departing from the spirit of my invention. For instance, instead of pretreating the dry wood with 35% acid I can use wood containing 20–40% moisture and treat directly with the liquefied sulfur dioxide or mixture of liquid sulfur dioxide and HCl. However, I prefer the first method of treatment which I have described because a certain amount of dilute acid is recovered in my process and this initial treatment is a very suitable way of utilizing this acid.

In the drawings Figure I is a semi-diagrammatic side elevation with some of the important elements shown partly in section. Figure II illustrates an apparatus which is suitable for the carrying out of a modified form of the process which is more fully explained hereinafter.

The detailed operation of my process will be explained by reference to Figure I. Wood chips, preferably of low moisture content, are charged into saccharifying vessel 1 through man-hole 2. This vessel is made of material to withstand hydrochloric acid corrosion. It may be lined with rubber or acid-proof tile or constructed of other acid resisting materials such as Haveg. It is provided with a porous or perforated bottom 3 and numerous pipe connections for introducing or removing the materials for treatment. The wood is first treated with an aqueous hydrochloric acid solution. This should preferably be of a constant boiling point composition of approximately 21% HCl by weight. It is preferred because the acid recovered later in the process is of this strength. However, a somewhat stronger acid may be used up to 35%.

The acid is withdrawn from tank 4 through pipe 5 and valve 6. It may either be allowed to percolate through the mass or the charge may be completely immersed and allowed to stand for a short time and then the acid withdrawn through pipe 7 and pump 8 and return to tank 4 through pipe 5. It is advantageous to use as little acid as possible and to insure uniform distribution of the acid throughout the charge. I have found it possible to obtain good results by adding to the charge an amount of acid such that the water contained therein is 80–100% of the dry weight of the wood. It will be obvious that this treatment serves only to wet the outside of the chips. Hence, the charge is allowed to stand 1 to 2 hours so as to permit the acid to permeate to the interior of the mass and become uniformly distributed throughout. If desired, this initial treatment with dilute HCl can be carried out in other equipment and allowed to stand for a seasoning period and then introduce the charge into the saccharifying vessel.

The next step in the process consists in passing a liquefied mixture of HCl and sulfur dioxide through the charge. This mixture passes from tank 10 through pipe 11 and valve 12 into the manifold 13. From thence it is distributed through the bed by sparger pipes 14. The solution of HCl gas and water leads to considerable heat. By utilizing a liquefied mixture of HCl and $SO_2$ it is possible to increase the strength of acid in the cellulosic mass to 50% or over and simultaneously balance this high heat absorption by the latent heat of evaporation of the liquefied gases. Hence, in the operation which we have just described both components of the liquefied gas vaporize, most of the HCl is absorbed enhancing the concentration of acid in the mass of chips and most of the sulfur dioxide passes out of the apparatus through pipe 15 and valve 16 and enters compression cylinder 17. It is therein compressed such as to about 30 pounds gauge. It passes through trap 18 thence through cooler 19 and into accumulator 20. The accumulator floats on the system thereby smoothing out the operation. If desired, the gas may be further compressed by passing through pipe 21 and valve 22 to a second compression cylinder 23 where it is compressed to the liquefying pressure and passing out through trap 24 and cooler 25 liquefies and collects in tank 10. The passage of the liquefied mixture of HCl and $SO_2$ through vessel 1 is continued until the desired hydrochloric acid concentration is built up in the cellulosic mass and the temperature is held to 0° C. or under.

If desired, the operation can be modified by employing, after the pretreatment with HCl, liquid sulfur dioxide in place of a mixture of liquid $SO_2$ and HCl. Thereby the mass is cooled down to approximately −10° C., the boiling point of liquid $SO_2$. Thereafter the mixture of liquefied $SO_2$ and HCl can be passed into the charge to enhance the concentration of hydrochloric acid therein.

By carrying out the saturation of the wood mass with strong hydrochloric acid as I have disclosed there are a great many advantages. One advantage is from a heat standpoint. The heat of solution of HCl to produce a 21% acid amounts to 775 B. t. u.'s per pound of HCl absorbed while the heat of solution to increase it to a 50% solution is 700 B. t. u.'s per pound absorbed. Thus by starting with a wood containing 21% solution there is only about 72% as much heat generated as if dry HCl gas were absorbed in wood containing only a high moisture content. The further advantages are that a substantially dry process is carried out. Although the wood mass in the initial treatment contains a 21% acid, this acid is completely absorbed in the interior of the chips and they do not have a wet appearance externally. Furthermore, by using a liquefied mixture of sulfur dioxide and HCl the acid concentration in the chips can be further increased to give any desired strength, and yet the temperature of the mass can be controlled as desired, which is so important in saccharification, as carbohydrate material, when in contact with strong hydrochloric acid very readily carbonizes if the temperature is allowed to rise too high.

After the two treatments which I have just described are completed, the wood mass is at a uniform temperature below atmospheric. It contains on the average a hydrochloric acid concentration of 50% or over. However, this acid is still not uniformly distributed throughout the mass. The third step in the treatment consists in pumping cold HCl gas to vessel 1 then releasing the pressure and repeating the process several times. This leads to a "breathing" action and very rapidly produces equilibrium conditions through the innermost parts of the individual chips. In order to accomplish this HCl gas obtained in accumulator 26 at a pressure of approximately 30 pounds gauge passes through cooler 27, pipe 28, valves 29 and 30 into the bottom of vessel 1. The pressure quickly builds up to that in the accumulator. The valve 29 is closed and the gas is drawn through pipe 31 and pump 32 and returns to the accumulator. By suitable mechanical control this process of producing the "breathing" action can be controlled automatically.

At the end of this third treatment there is uniformly distributed through the cellulosic mass a high strength of hydrochloric acid of 50% or over, and the temperature of the same has been held to a temperature considerably below atmospheric throughout the whole process. The charge is now allowed to stand for a sufficient time to complete the saccharification, and I have found that 10 to 15 hours is sufficient. The mass now consists of lignin, sugar and strong hydrochloric acid. The final treatment consists in removing the hydrochloric acid and dissolving the sugar from the lignin. In order to remove the hydrochloric acid valve 30 is open, valve 29 is closed and the vessel is evacuated through pipe 31 and pump 32, the compressed hydrochloric acid passing into accumulator 26. I found that by this evacuation treatment a considerable amount of HCl is removed from the mass. However, it is not possible by this means to remove all of the HCl gas which was absorbed in the constant boiling point mixture because as evacuation proceeds the desorption of HCl gas produces a cooling effect thereby lowering the partial pressure of the HCl and gradually preventing the withdrawal of further quantities from the mass. Heat must then be supplied. In order to accomplish this steam is admitted through pipe 33 at the bottom of vessel 1. Valve 30 is closed and the steam passes up through the charge thereby giving up its heat and expelling HCl gas which passes out of the top through valve 34 and pipe 35 into cooler 36 and passes out of the bottom through pipes 37 and 38 and valve 39 thence through pipe 31 into the suction side of pump 32 which leads it to accumulator 26. By thus applying evacuation, steaming can be carried out at a rather low temperature which is important particularly in the early stages of gas removal so as to prevent carbonization of the saccharified mass. Toward the end of the process, when the constant boiling point composition is being approached, the vacuum can be reduced thereby producing a rise in temperature and thus aiding in the withdrawal of HCl gas without decomposing the sugar in the charge. It is to be noted that the partial pressure relationships of hydrochloric acid solutions above the constant boiling point composition are such that a substantially dry gas is withdrawn over the major part of the range from a 50% acid down to a 21% acid. However, toward the end when the constant boiling point composition is being approached some water vapor is also withdrawn, and it is condensed in heat exchanger 36. Some aqueous hydrochloric acid then collects in pot 40 and may be withdrawn through valve 41 and added to the liquid supply in tank 4.

After this treatment the acid concentration in the saccharified mass has been reduced to about the original concentration of 21%. This acid is removed by pumping air through blower 42 and heater 43, thence through pipe 44 and valve 45. It then passes through the charge and out of the top of vessel 1 through pipe 35 and enters heat exchanger 36.

The air, containing HCl gas and water vapor, passes out through pipe 37, valve 46 and pipe 47 into water scrubber 48 where the hydrochloric acid is absorbed giving an approximately 15% acid which passes out of the bottom through the pipe 49 and collects in storage tank 50. The air passes out of the top of the scrubber through pipe 51 and is vented to the atmosphere. From storage tank 50, dilute acid is delivered by pump 52 and pipe 53 into concentrating column 54. At the top of the column is a dephlegmator 56 for providing reflux. The acid at the bottom of the column is of a constant boiling point composition and collects tank 57 from which it may be withdrawn through pump 58 and delivered through pipe 59 and valve 60 into storage tank 4. While I have shown removal of the constant boiling acid from the mass with steam in the regular saccharifying vessel it is understood that this operation can also be carried out in separate equipment such as a rotary kiln without departing from the spirit of this invention.

After this operation the treated mass now contains substantially pure lignin and sugar with only traces of hydrochloric acid. There is now added to the mass a strong sugar solution from the previous batch and the slurry discharged from the vessel 1 through pipe 61 and valve 62. The lignin is then filtered from the solution and subjected to countercurrent washing until free of sugar. The sugar solution, which will run 10–15% concentration, is heated to produce hydrolysis of the polyoses, the small amount of hydrochloric acid remaining being sufficient to produce this inversion. The pH of the solution is then adjusted by addition of small amounts of lime and it is then suitable for fermentation by either yeast or bacteria; or, if desired, it may be evaporated and the sugar crystallized therefrom in edible form.

It will be noted that I have described a closed process in which no appreciable amount of the HCl has been lost and the gases and the various fluids used in the treatment are returned to the receivers from which they were withdrawn. Futhermore, there is no appreciable gain or loss of water in the treatment. The conversion of cellulose to sugar is represented by the following equation: $(C_6H_{10}O_5)_x + XH_2O \rightarrow XC_6H_{12}O_6$.

As this equation indicates the chemical reaction requires 11.1% water based on the cellulose content of the wood. With the wood containing 54% cellulose, this represents 6% of the weight of incoming wood.

Figure 2:
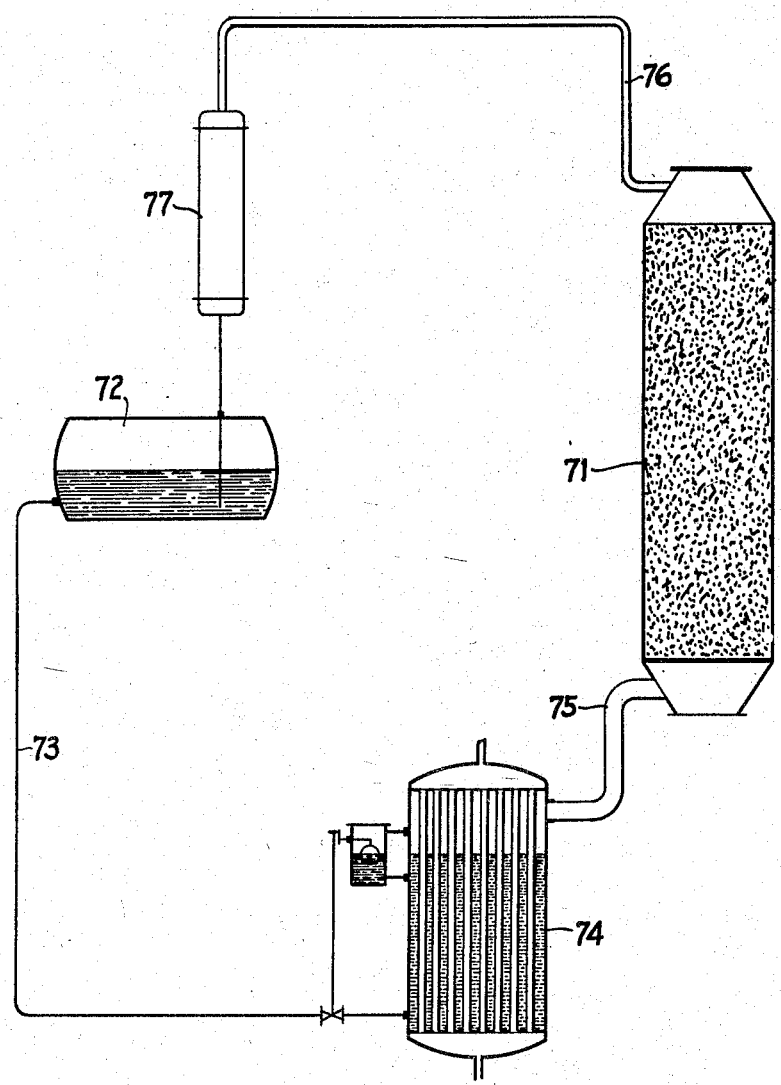

It is desirable to use the minimum amount of water in the pretreatment step which means a corresponding saving in the subsequent work involved in flushing it from the saccharified mass as constant boiling composition acid by the use of the heated air. The amount of water can be reduced to the minimum and collateral advantages obtained by modification of the pretreatment step. It will be described by reference to Figure 2. Wood chips, preferably in a bone dry condition, are charged into vessel 71 which may be the same equipment as described in Figure 1 or it may be a separate apparatus. The constant boiling point composition of hydrochloric acid is fed from tank 72 through pipe 73 into boiler 74. This boiler is preferably heated by steam and the issuing HCl gas and water vapor of constant boiling point composition pass through pipe 75 into the bottom of the vessel holding the charge of wood chips. The mixture of gas and vapor passes upwards through the charge and the treatment is continued until the cellulosic material has come to equilibrium with the gaseous mixture of HCl and steam at the boiling point which is 110° C. I have found that by this treatment an average wood will take up about 25% of its weight of aqueous hydrochloric acid of maximum boiling point composition of HCl of 20.5% concentration. The amount of hydrochloric acid that is added to the wood mass in this treatment can be regulated by controlling the pressure during the steaming operation.

During the steaming operation considerable quantities of furfuraldehyde and acetic acid are distilled from the wood and pass out the top of vessel 71 through pipe 76 along with steam and HCl gas, and the vapors condense in condenser 77 and the liquid returns to tank 72. There are several advantages of this method of pretreatment; one is that the cellulose material is impregnated uniformly with the maximum boiling point composition of hydrochloric acid and the quantity of water present therein is kept to a very minimum. This gives an advantage mentioned above that a very much smaller quantity of hot air is required in the last step of the process to remove it from the saccharifying mass.

The other advantage is that the pentoses present in the wood, such as arabinose and xylose are almost completely converted into furfuraldehyde and are steam distilled from the charge. Furfuraldehyde can then be readily separated from the dilute hydrochloric acid either by withdrawing small quantities of the acid continuously by distillation or by periodic removal of this constituent. It is found very advantageous to remove the furfuraldehyde, particularly if the recovered sugar solution is to be subjected to yeast fermentation for production of ethyl alcohol. If the pentoses are allowed to remain in the cellulosic material and are later extracted along with hexose sugars they are lost since they are not fermentable by yeast.

The application of my process has an advantage in the fact that it enables one to control the amount of moisture absorbed in the wood fiber in the preliminary treatment and utilizes for the purpose the strength of acid which is recovered from the mass in the final treatment after saccharification. The conversion of the pentoses into furfuraldehyde and the recovery of the latter is incidental but possesses the further advantage of yielding more valuable products from the wood than would otherwise be the case.

As stated previously this modified pretreatment can be done in the regular saccharifying vessel or in a separate piece of equipment. If the latter procedure is adopted, the charge of wood is transferred into the regular saccharifying vessel and the subsequent treatment is carried out as I have described above. This treatment then replaces the soaking or percolating of the chips with cold dilute acid. However, the later treatments remain the same, that is the liquefied mixture of sulfur dioxide and HCl is introduced into the charge for simultaneous cooling and raising the acid concentration to the desired degree.

Thus it may be seen that my invention involves (1) the treatment of wood having a moisture content of approximately 20–40% present as such or in the form of dilute HCl with a mixture of liquid $SO_2$ and liquid anhydrous HCl whereby the $SO_2$ evaporates off due to the solution of the HCl in the moisture present and (2) the alternate pumping in of dry HCl gas increasing the pressure on the wood and pumping out of the gas thereby diminishing the pressure on the wood, referred to herein as a breathing action, both of which features I have found necessary to the successful saccharification of wood with HCl. The amount of HCl employed is preferably sufficient to assure a concentration of HCl of 50% or more in the wood. The amount of liquid $SO_2$ should be sufficient to dissipate the heat generated by the solution of the HCl in the moisture present in the wood and to prevent the temperature from rising above atmospheric. The breathing action should be repeated at least 3 times and in actual operation at least 6 times is desirable.

I claim:

1. A method of saccharifying cellulosic material which comprises treating pieces of the cellulosic material containing at least 12% of moisture with a mixture of liquefied $SO_2$ and liquefied anhydrous HCl, allowing the $SO_2$ to evaporate off thereby absorbing heat from the solution of HCl in the moisture of the cellulosic material and lowering the temperature of the mass to that at which carbonization will not occur, alternately breathing HCl gas in and out of the mass and then allowing the mass to stand until the cellulose therein has substantially been converted into sugar.

2. A method of saccharifying wood which comprises treating pieces of wood containing at least 12% of moisture with a mixture of liquefied $SO_2$ and liquefied anhydrous HCl, allowing the $SO_2$ to evaporate off thereby absorbing heat from the solution of HCl in the moisture of the wood and lowering the temperature of the mass to that at which carbonization will not occur, alternately breathing HCl gas in and out of the mass and then allowing the mass to stand until the cellulose therein has substantially been converted into sugar.

3. A method of saccharifying wood which comprises wetting pieces of wood with dilute hydrochloric acid so that the water present is at least 12% of the dry weight of the wood, treating the mass with a mixture of liquefied $SO_2$ and liquefied anhydrous HCl in an amount sufficient to increase the strength of the hydrochloric acid in the wood to at least 50%, the $SO_2$ being allowed to evaporate off thereby absorbing heat from the solution of HCl in the moisture of the wood and lowering the temperature of the mass to that at which no carbonization of the cellulose present will occur, alternately pumping cold HCl gas under pressure into the mass and releasing the pressure a plurality of times and subsequently allowing the mass to stand until the cellulose of the wood has been substantially converted into sugar.

4. A method of saccharifying wood which comprises wetting pieces of wood with aqueous hydrochloric acid of 21% strength so that the water present is at least 12% of the dry weight of the wood, treating the wood with a mixture of liquefied $SO_2$ and liquefied anhydrous HCl in an amount sufficient to increase the strength of the hydrochloric acid in the wood to at least 50%, allowing the $SO_2$ to evaporate off thereby absorbing heat from the solution of HCl in the moisture of the wood and lowering the temperature to that at which carbonization of the cellulose present will not occur, alternately pumping in and releasing the pressure of cold HCl gas a plurality of times and subsequently allowing the mass to stand until the cellulose of the wood has been substantially converted into sugar.

5. A method of saccharifying wood which comprises passing a mixture of HCl gas and water vapor through a mass composed of pieces of wood until equilibrium is reached, treating the mass with a mixture of liquefied $SO_2$ and liquefied anhydrous HCl in approximately equal proportions in an amount sufficient to increase the strength of the hydrochloric acid in the wood to at least 50%, allowing the $SO_2$ to evaporate off thereby absorbing the heat from the solution of HCl in the moisture of the wood and lowering the temperature to that at which no carbonization of the cellulose of the wood will occur, alternately pumping in and releasing cold HCl gas at least three times and subsequently allowing the mass to stand until the cellulose has been substantially converted into sugar.

RUDOLPH LEONARD HASCHE.